United States Patent
Khan et al.

(10) Patent No.: US 6,190,636 B1
(45) Date of Patent: Feb. 20, 2001

(54) CHLORO-HYDROGENATION OF SODIUM SULFATE AND OTHER ALKALI-METAL SULFATES

(76) Inventors: Mohammed N. I. Khan, 1008 9th Ave. South, Clear Lake, IA (US) 50428; M. Fazlul Hoq, 1367 Boswall Dr., Worthington, OH (US) 43085

( * ) Notice: Under 35 U.S.C. 154(b), the term of this patent shall be extended for 0 days.

(21) Appl. No.: 09/347,827

(22) Filed: Jul. 2, 1999

Related U.S. Application Data

(60) Provisional application No. 60/103,893, filed on Oct. 13, 1998.

(51) Int. Cl.[7] .............................. C01B 9/02; C01B 17/74; C01B 17/90; C01D 3/04
(52) U.S. Cl. ..................... 423/499.4; 423/522; 423/488
(58) Field of Search ..................... 423/522, 488, 423/499.4, 499.5

(56) References Cited

U.S. PATENT DOCUMENTS

| | | | |
|---|---|---|---|
| 2,531,137 | 11/1950 | Laubi et al. | 423/499.4 |
| 4,393,035 | 7/1983 | Fredette | 423/522 |
| 4,393,036 | 7/1983 | Fredette | 423/522 |
| 4,462,976 | 7/1984 | Karsen | 423/488 |
| 4,508,593 | 4/1985 | Bergstrom | 423/522 |

FOREIGN PATENT DOCUMENTS

| | | | |
|---|---|---|---|
| 1567484 | 5/1969 | (DE) | 423/522 |

*Primary Examiner*—Gary P. Straub
(74) *Attorney, Agent, or Firm*—Zarley, McKee, Thomte, Voorhees & Sease

(57) ABSTRACT

A novel method is described whereby chlorine and sodium sulfate waste by-products from chemical by-products are recycled to form useful chemicals. Sodium sulfate is first reacted to form a metal sulfate and sodium chloride. The sodium chloride may be used as a chemical feed in chlor-alkali plants. The metal sulfate is then reacted to form an ammonium sulfate or bisulfate which in turn is reacted with chlorine to form sulfuric acid. The sulfuric acid may be used a chemical feed in chlorine dioxide plants and in various other chemical processes.

14 Claims, No Drawings

CHLORO-HYDROGENATION OF SODIUM SULFATE AND OTHER ALKALI-METAL SULFATES

CROSS-REFERENCE TO RELATED APPLICATION

This application is a continuation of provisional application Serial No. 60/103,893 filed Oct. 13, 1998.

FIELD OF THE INVENTION

This invention relates to the production of industrial chemicals. More specifically, the invention describes the recycling of hazardous waste by-products to generate sodium chloride and sulfuric acid feed materials for chemical processes.

BACKGROUND OF THE INVENTION

Caustic soda is employed by a wide range of industries as building blocks for such commonly used products as plastics, bleach, flexible and rigid foams, pharmaceuticals, herbicides, paper products, and for water purification and neutralization. Caustic soda (NaOH, lye), or sodium hydroxide, is produced simultaneously with chlorine, usually through the electrolytic decomposition of sodium chloride solutions in diaphragm, membrane, or mercury cells.

In most applications, caustic is sold and used as a 50% solution in water. It is valued more for its neutralizing power as a strong base and as an absorbent than as a source of sodium. End-uses for caustic soda include pulp and paper, soaps and detergents, aluminum, petroleum, natural gas refining and processing, and water treatment and cotton processing. It is also used to produce a wide range of organic and inorganic chemicals.

The most inexpensive source of caustic soda is from chlor-alkali plants. The feed material for chlor-alkali cells is sodium chloride solution. Chlorine is produced as an inevitable by-product of the chlor-alkali process, at a rate of 1.0 to 1.1, usually through the electrolytic decomposition of salt solutions in electrolytic diaphragm, membrane or mercury cells. This chlorine by-product has been used by pulp mills as a bleaching agent since the turn of the century. Recently, it has been found that chlorine bleaching produces highly hazardous organochlorine compounds. Environmental protection agencies have therefore prohibited the use of chlorine for pulp bleaching.

Caustic soda producers have attempted to find alternative technologies for producing caustic soda without the formation of undesirable chlorine by-product. These alternative methods, however, are not nearly as efficient as chlor-alkali cells. As a result, the price of caustic soda has increased several-fold.

During the last few years, chlorine dioxide has represented a commercially viable alternative for chlorine in bleaching pulp. The starting materials for chlorine dioxide are sulfuric acid, sodium chlorate, and a reducing agent, such as methanol or hydrogen peroxide. The inevitable by-product of this chlorine dioxide process is sodium sulfate ($Na_2SO_4$), which is commercially known as salt cake. A part of the salt cake by-product is consumed by pulp mills to make sodium sulfide, a component of black liquor. However, the bulk of the salt cake does not have any use and must simply be disposed of. Salt cake is also the waste by-product of several other chemical processes.

The present inventors have now discovered a means of utilizing chlorine and salt cake waste to generate starting materials for chlor-alkali cells and chlorine dioxide generators through chemical reactions of chlorine and sodium sulfate.

It is therefore a primary objective of the present invention to provide a method of producing caustic soda using chlor-alkali cells which includes a means of utilizing the hazardous chlorine by-product generated.

It is a further objective of the present invention to provide a method of producing chlorine dioxide which includes a means of utilizing salt cake by-product.

It is still a further objective of the present invention to provide a method of recycling waste chlorine and salt cake by-products to produce chemical feeds for use in industrial processes.

It is a further objective of the present invention to provide a method of recycling waste chlorine and salt cake by-products which is environmentally safe.

It is a further objective of the present invention to provide a method of recycling waste chlorine and salt cake by-products which is economical.

It is a further objective to prevent the loss of significant capital investments in the construction of chlor-alkali plants.

These and other objectives will become apparent from the following description.

SUMMARY OF THE INVENTION

The present invention describes a method of utilizing waste by-products generated during the manufacture of chlorine dioxide, caustic soda, and other industrial chemicals. Sodium sulfate or other alkali-metal sulfate is initially combined with an alkaline earth metal chloride to produce a metal sulfate precipitate and sodium chloride solution. The sodium chloride solution is removed and may be used as a chemical feed in chlor-alkali plants. The metal sulfate precipitate may be further reacted with ammonia and carbon dioxide to produce ammonium sulfate or bisulfate. The ammonium sulfate and/or ammonium bisulfate in turn may be reacted with the chlorine waste by-product to produce sulfuric acid. Sulfuric acid may then be used as a chemical feed in chlorine dioxide plants, as well as various other chemical processes.

Applicants' recycling process provides new uses for otherwise useless chemical by-products, while being environmentally safe and economical. The present invention also allows chlor-alkali and chlorine dioxide plants to continue producing industrial chemicals in their most efficient manner.

DETAILED DESCRIPTION OF THE PREFERRED EMBODIMENT

As set forth above, the present invention discloses the generation of starting materials for chlor-alkali cells and chlorine dioxide generators through the reaction of two chemical waste by-products, chlorine and sodium sulfate (salt cake). Until now, there was no practical means of disposing of these waste chemicals. Because of this, the owners of chlor-alkali plants generating chlorine as an inevitable by-product of their sodium hydroxide production have been forced to search for alternative ways of manufacturing sodium hydroxide without producing chlorine.

Instead of focusing on alternative ways of producing sodium hydroxide, the present inventors have found a way of disposing of the unwanted chlorine and sodium sulfate by-products generated by chlor-alkali and chlorine dioxide plants. Chlor-alkali plants are the least expensive and most efficient means of producing caustic soda. Thus, in finding a new use for hazardous chlorine waste by-product, chlor-alkali plants which otherwise would have had to cease operation can be allowed to continue efficient and relatively inexpensive generation of caustic soda. This finding could potentially save the chemical industry billions of dollars of capital investment in chlor-alkali plants.

The chemical combination of chlorine and sodium sulfate results in the following net reaction to produce sodium chloride and sulfuric acid:

$$Cl_2 + H_2 + Na_2SO_4 \rightarrow 2NaCl + H_2SO_4$$

Other alkali-metal sulfates may be substituted for sodium sulfate in this reaction, including lithium sulfate and potassium sulfate. If another alkali metal other than sodium sulfate is included in the reaction, the chloride produced is the salt of that alkali metal.

Sodium chloride is commonly used as a feed chemical for chlor-alkali plants while sulfuric acid is used as a feed chemical for chlorine dioxide plants and in a variety of other chemical processes. Chlorine and salt cake waste by-products are consumed in this net reaction.

The net chemical reaction shown above does not occur directly. Instead, chlorine and sodium sulfate are first processed to convert sodium sulfate (or other alkali-metal sulfate) to ammonium sulfate, ammonium bisulfate, or combinations thereof, which in turn are reacted with chlorine to form hydrochloric acid and sulfuric acid.

The reaction process generally proceeds as follows. First, sodium sulfate or other alkali-metal sulfates are reacted with a metal chloride to form a metal sulfate precipitate and sodium chloride (or other alkali-metal chloride) as follows:

(1) 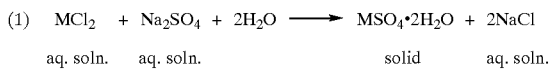

aq. soln.    aq. soln.              solid    aq. soln.

In reaction (1), the metal (M) is an alkaline earth metal, which is preferably calcium, strontium, or combinations thereof. If another alkali metal other than sodium sulfate is used in the reaction, the resulting product will include the chloride salt of that alkali metal. For example, if potassium sulfate is used as a reactant, potassium chloride will be a product of the reaction.

Metal sulfate is generated as a precipitate by adding a one molar to saturated solution of sodium sulfate to a one molar to saturated solution of metal chloride at a pH range of from about 0.5 to 5.0. The metal sulfate precipitate is separated by centrifugation, washed with water, then slurried with about a 0.5 molar to saturated aqueous ammonia in preparation for the generation of ammonium sulfate and/or ammonium bisulfate.

Residual alkaline earth metal and sulfate ions are preferably removed from the sodium chloride filtrate. This is preferably accomplished by treatment of the alkaline earth metal ions with aqueous $Na_2CO_3$ and treatment of the sulfate ions with aqueous $BaCl_2$, followed by concentration and pH adjustment. The sodium chloride (or other alkali-metal chloride) filtrate is then ready for use as a feed for chlorate or chlor-alkali plants.

The slurried metal sulfate precipitate produced in reaction (1) is next combined with carbon dioxide and ammonia to produce ammonium sulfate as in 2(a), with ammonium carbonate as in 2(b), or with ammonium bicarbonate as in 2(c):

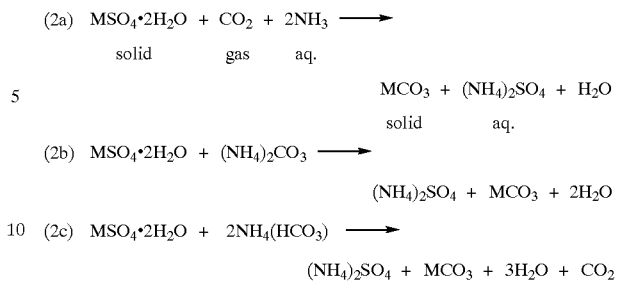

Chlorine is then reacted with ammonium sulfate and/or ammonium bisulfate either in gas/vapor phase, or present in solution or as a slurry in mediums such as water or concentrated sulfuric acid to produce sulfuric acid, hydrochloric acid, and nitrogen gas. Ammonium bisulfate is generated in solution when ammonium sulfate is added to an aqueous or concentrated sulfuric acid. The sulfuric acid produced may be used as a feed chemical for chlorine dioxide plants and in a variety of other chemical processes, such as preparation of perchloric acid, in oil refineries, and steel mills. The overall reactions are set forth below as reactions (3A) and (3B):

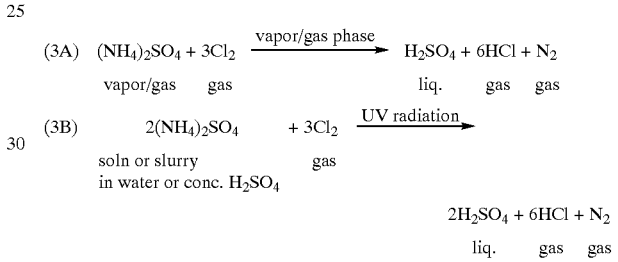

Vapors, at $\geq 200°$ C., ammonium sulfate and bisulfate at 10° C. to 235° C. also react with chlorine to produce sulfuric acid and hydrogen chloride. For commercial production of sulfuric acid and hydrochloric acid, sulfuric acid is the preferred medium due to its heat transfer ability as a liquid over a wide range of temperatures, as well as the lower solubility of hydrochloric acid in its liquid form.

Vapors of ammonium sulfate and/or ammonium bisulfate are typically dissociation products, such as ammonia and sulfuric acid, and sulfur trioxide. The reaction is performed at an overall pressure of between about 0.076–76000 mm mercury at a temperature range of between about 200–1000° C. using either stoichiometric amounts or an excess of chlorine. This reaction may be performed with or without a catalyst. If a catalyst is included, the preferred catalysts are transition or rare-earth metal based catalysts, which are most preferably platinum, vanadium pentoxide, cobalt chloride, nickel chloride, rare-earth metal chlorides, and mixtures thereof.

The chlorine gas may also be reacted with a slurry or a 1 molar to saturated solution of ammonium sulfate and/or ammonium bisulfate in water or sulfuric acid which is being irradiated with ultraviolet light to break Cl—Cl and N—H bonds at temperatures ranging from 5–350° C.

In a flow reactor system for reaction 3(B), chlorine gas is allowed to pass through one or more of the following:
   (i) a 0.5% to saturated solution of ammonium sulfate or bisulfate in concentrated sulfuric acid at a temperature of from about 10° C. to 340° C.;
   (ii) a slurry of 10% to 90% ammonium sulfate or bisulfate in concentrated sulfuric acid at a temperature of from about 10° C. to 255° C.;

(iii) crystals or granules or flakes of ammonium sulfate at a temperature of from about 10° C. to 255° C.;

(iv) molten ammonium sulfate at >280° C. and ammonium bisulfate at a temperature of from about 145° C.;

(v) a 0.5% to saturated solution of ammonium sulfate in water at a temperature of from about 10° C. to 110° C.; or (vi) a slurry of from about 10%–90% of ammonium sulfate in water at a temperature of from about 10° C. to 110° C.

In (i)–(vi) above, the chemicals preferably flow downwards through a commercial gas absorption tower. Flow rates and tower dimensions are preferably adjusted to minimize chlorine contents in the vent gases of hydrogen chloride and nitrogen. A gas phase reaction (vii) which includes the reaction of chlorine gas with vapors of ammonium sulfate or bisulfate at >200° C. to form sulfuric acid and hydrogen chloride is also possible. Reactions 3A and 3B may also be conducted in batch reactions under the same reaction conditions listed above for flow reactors.

In an optional procedure, the aqueous slurry of 15% to 95% metal carbonate generated in reaction (2) is allowed to flow downwards in a commercial gas absorption tower at a temperature range of from about 10° C.–90° C. through which the gaseous hydrogen chloride and nitrogen from reaction 1 are passing to generate metal chloride as set forth in reaction (4):

(4)   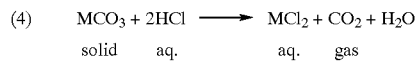
    solid   aq.        aq.    gas

Again, in this reaction M is an alkaline earth metal. This reaction may also take place by high pressure (5–700 atmosphere) absorption in a batch reactor at a temperature of between about 10–90° C. The alkaline earth metal is preferably calcium, strontium, or mixtures thereof. This metal chloride may be used as a reactant with the alkali-metal sulfate in reaction (1).

In another optional procedure, product gases $CO_2$ generated in reaction (4) and $N_2$ generated in reactions (3A) and/or (3B) may be mixed with $NH_3$ gas to provide a molar ratio of approximately $NH_3:CO_2 = 2:1$. This is then passed through an aqueous slurry of 0.5% to 95% $MSO_4·2H_2O$ which flows downward through a commercial gas absorption tower operating at the temperature range of from about 10°–50° C. or a high pressure (5–700 atmosphere) absorption of gaseous reactants by the metal carbonate slurry in a batch reactor at a temperature of between about 10–90° C. Flow rates and tower dimensions are preferably adjusted to minimize the contents of $NH_3$ and $CO_2$ in the vent gas nitrogen. The precipitate of metal carbonate produced is separated by centrifugation, washed with water and then slurried with water to form a 10–50% by weight aqueous slurry. The filtrate left after metal carbonate separation is adjusted to a pH of less than about 8, and preferably between 2 to 6, by addition of sulfuric acid or other suitable acid, then evaporated under reduced pressure (20 mm to 500 mm of mercury) and elevated temperatures (35–105° C.) to generate crystals/flakes of pure ammonium sulfate which may be used in reaction (3).

It is therefore submitted that the present invention accomplishes at least all of its stated objectives.

What is claimed is:

1. A method of recycling by-products from industrial processes comprising:

reacting an alkali-metal sulfate with an alkaline earth metal chloride to produce an alkaline earth metal sulfate precipitate and alkali metal chloride solution;

separating the alkaline earth metal sulfate precipitate from the alkali metal chloride solution;

combining the alkaline earth metal sulfate precipitate with a reagent selected from the group consisting of ammonia/carbon dioxide mixtures, ammonium carbonate, and ammonium bicarbonate to produce ammonium sulfate and an alkaline earth carbonate precipitate;

separating the alkaline earth carbonate precipitate from the ammonium sulfate; and mixing chlorine with the ammonium sulfate, ammonium bisulfate, or mixtures thereof to produce sulfuric acid, hydrochloric acid and nitrogen.

2. A method according to claim 1 further comprising the step of:

reacting the hydrochloric acid with the alkaline earth metal carbonate to product alkaline earth metal chloride solution and carbon dioxide.

3. A method according to claim 1 wherein the alkali metal is sodium and the alkaline earth metal is selected from the group consisting of calcium, strontium, and a mixture thereof.

4. A method according to claim 1 further including the step of:

washing the metal sulfate precipitate with water and slurrying the washed metal sulfate precipitate with about a 0.5 molar to saturated aqueous ammonia; and absorbing carbon dioxide gas in the slurried metal sulfate precipitate to form metal carbonate precipitate and ammonium sulfate solution.

5. A method according to claim 4 wherein the slurried metal sulfate precipitate contains from about 5–50% metal sulfate and a ratio of metal sulfate to ammonia of about 1:2.

6. A method according to claim 1 further including the steps of:

washing the metal carbonate precipitate with water; and forming an aqueous slurry with the metal carbonate.

7. A method according to claim 6 further including the step of:

absorbing hydrogen chloride gas in the aqueous slurry to form metal chloride solution and carbon dioxide gas.

8. A method according to claim 1 further including the step of:

slurrying the metal sulfate precipitate in a 0.5 molar to saturated solution containing a compound selected from the group consisting of ammonium carbonate, ammonium bicarbonate, and a mixture thereof, to generate a solution of ammonium sulfate and a precipitate of metal carbonate.

9. A method according to claim 1 further including the step of:

evaporating the liquid from the ammonium sulfate solution to form solid form ammonium sulfate.

10. A method according to claim 9 wherein the evaporation step is performed at pH of less than 8 at reduced pressures of 20–500mm mercury and a temperature range of between about 35–105° C.

11. A method according to claim 1 wherein the chlorine is reacted ammonium sulfate, ammonium bisulfate, or a mixture thereof at a pressure of between 0.076–7600 mm mercury at a temperature of between about 200–1000° C.

12. A method according the claim 11 wherein the reaction is accelerated in the presence of a catalyst which is selected from the group consisting of platinum, vanadium pentoxide, cobalt chloride, nickel chloride, care earth metal chloride, and mixtures thereof.

13. A method according to claim 1 wherein the chlorine is reacted with a slurry or 1 molar to saturated solution of the ammonium sulfate, ammonium bisulfate, or mixture thereof in water or sulfuric acid which is being irradiated with ultraviolet light.

14. A method according to claim 13 wherein the reaction takes place at a temperature ranging from about 5–350° C.

* * * * *